(12) United States Patent
Andre

(10) Patent No.: US 6,363,860 B1
(45) Date of Patent: Apr. 2, 2002

(54) TWO-WAY GUIDING ASSEMBLY ALONG A RAIL FOR A ROAD AXLE LATERAL OFFSET

(75) Inventor: Jean-Luc Andre, Obernai (FR)

(73) Assignee: Lohr Industrie, Hangenbieten (FR)

( * ) Notice: Subject to any disclaimer, the term of this patent is extended or adjusted under 35 U.S.C. 154(b) by 0 days.

(21) Appl. No.: 09/674,189
(22) PCT Filed: Apr. 30, 1999
(86) PCT No.: PCT/FR99/01041
§ 371 Date: Oct. 27, 2000
§ 102(e) Date: Oct. 27, 2000
(87) PCT Pub. No.: WO99/56999
PCT Pub. Date: Nov. 11, 1999

(30) Foreign Application Priority Data

Apr. 30, 1998 (FR) ............................................. 98/05693

(51) Int. Cl.$^7$ ................................................ B61C 11/00
(52) U.S. Cl. ...................... 105/72.2; 104/243; 104/244; 104/245
(58) Field of Search .................. 104/242, 243, 104/244, 245, 247; 105/72.2, 215.1, 215.2; 180/401

(56) References Cited

U.S. PATENT DOCUMENTS 3,180,280 A    4/1965  Kuch et al.
5,704,295 A  * 1/1998  Lohr ........................... 104/243
5,758,583 A  * 6/1998  Lohr ........................... 105/72.2
6,029,579 A  * 2/2000  Andre et al. ................ 105/72.2

FOREIGN PATENT DOCUMENTS

FR    2 759 340    8/1998
FR    97 01709     8/1998

* cited by examiner

Primary Examiner—Mark T. Le
(74) Attorney, Agent, or Firm—Davis & Bujold, P.L.L.C.

(57) ABSTRACT

A two-way assembly consisting of a chassis-frame (11) formed by two branches (17) and (18) articulated pivoting about two end pins (21) and (22) each bearing two inclined guide rollers (14) along a rail (8). The chassis-frame (11) is longitudinally movable relative to the road axle (2) for reversing an automatically guided travel direction by the effect of a reversing actuator (15). The chassis-frame (11) can be lifted after the rollers (14) have disengaged from the guide rail (8) by a lifting mechanism acting on the chassis-frame arms. The axle (12) is automatically guided by a subassembly guided (9) by the chassis-frame (11). The guided subassembly (9) capable of being displaced transversely at the rear about a pivot point located in the proximity of the front rollers. The invention is particularly advantageous to manufacturers of rail-mounted road vehicles.

20 Claims, 8 Drawing Sheets

TWO-WAY GUIDING ASSEMBLY ALONG A RAIL FOR A ROAD AXLE LATERAL OFFSET

This invention concerns a bidirectional guide rail assembly for the axle of a road vehicle.

BACKGROUND OF THE INVENTION

Numerous rail guide devices for vehicles already exist.

Specifically, the inventions of the Société LOHR INDUSTRIE relate to a guide arm with two angled guide wheels which move along a guide rail.

This arm provides directional reference for an automatic steering mechanism.

The guide arm located at the front of the axle can be duplicated by using an arm at the rear of the axle.

For example, if the wheels on the axle lose traction or if strong cross winds or some other factor cause the vehicle to drift, it is desirable to eliminate excess pressure on the guide assembly by allowing the rear arm to slightly shift in a lateral direction over a specific area.

Another invention of the Société LOHR INDUSTRIE addressing this issue, filed in France as No. 97 01709, concerns a directional assembly with a limited lateral offset.

This bidirectional assembly consists of two independent double guide arms, one in the front and one in the rear. Each arm has an angled guide wheel engaged on a guide rail and moving along the rail, with the rear arm having the capacity for clearance.

The capacity for clearance is possible because of flexible transverse deformations in the connection between the arms and the chassis.

The front and rear guide means are not interconnected by a rigid mechanical assembly; therefore each arm can be raised individually, requiring complex assembly and controls.

SUMMARY OF THE INVENTION

One of the first goals of the invention is to provide a rigid connection between the front and rear guide wheels, thereby eliminating the formation of any angle between the arms and the guide rail, which is a configuration that can easily lead to derailment.

Another primary goal of the invention is to propose a simple and reliable method for modifying the configuration and allowing the vehicle to remain in guided mode when the direction of operation is reversed.

A secondary goal of the invention is to provide a bidirectional self-guiding assembly allowing easy transition between automatic guided mode along a rail to manual mode, in which the driver steers the vehicle.

A third goal of the invention is to allow the guide wheels to be raised during operation by simply freeing the mechanism holding the guide wheels together, followed by raising the assembly by using the lifting arms.

A fourth goal is to ensure that the guide wheels are firmly engaged on the guide wheels and locked in position.

DESCRIPTION OF THE DRAWINGS

Other features and advantages of the invention will become apparent from the following description, furnished by way of a non-limitative example, with reference to the drawings, wherein.

DESCRIPTION OF THE PREFERRED EMBODIMENTS

Figure 1:
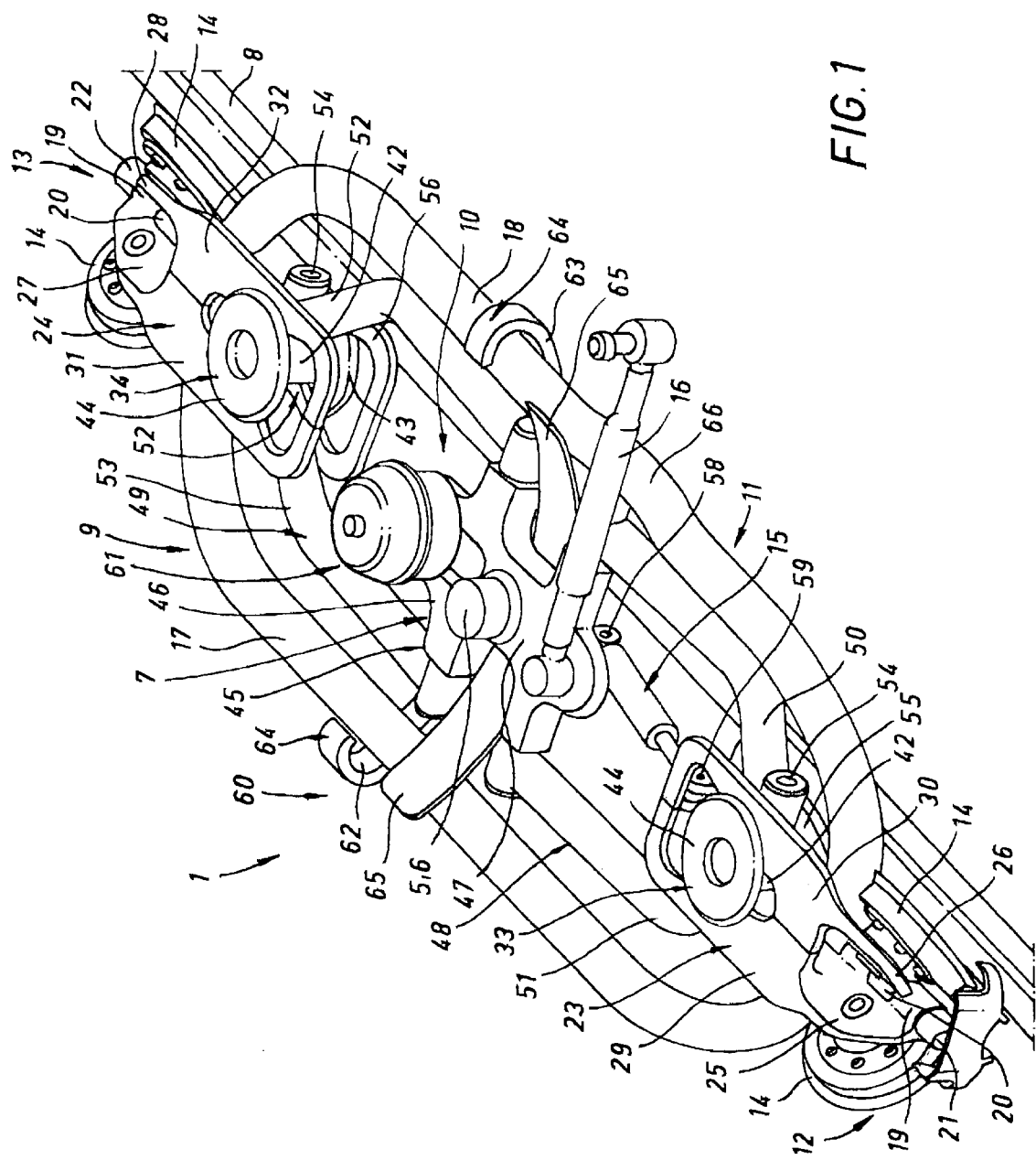
FIGS. 1 and 2 are general perspective views showing the bidirectional assembly according to the invention in the raised or neutral position (manual mode) and in the guided motion position, respectively.
Figure 2:
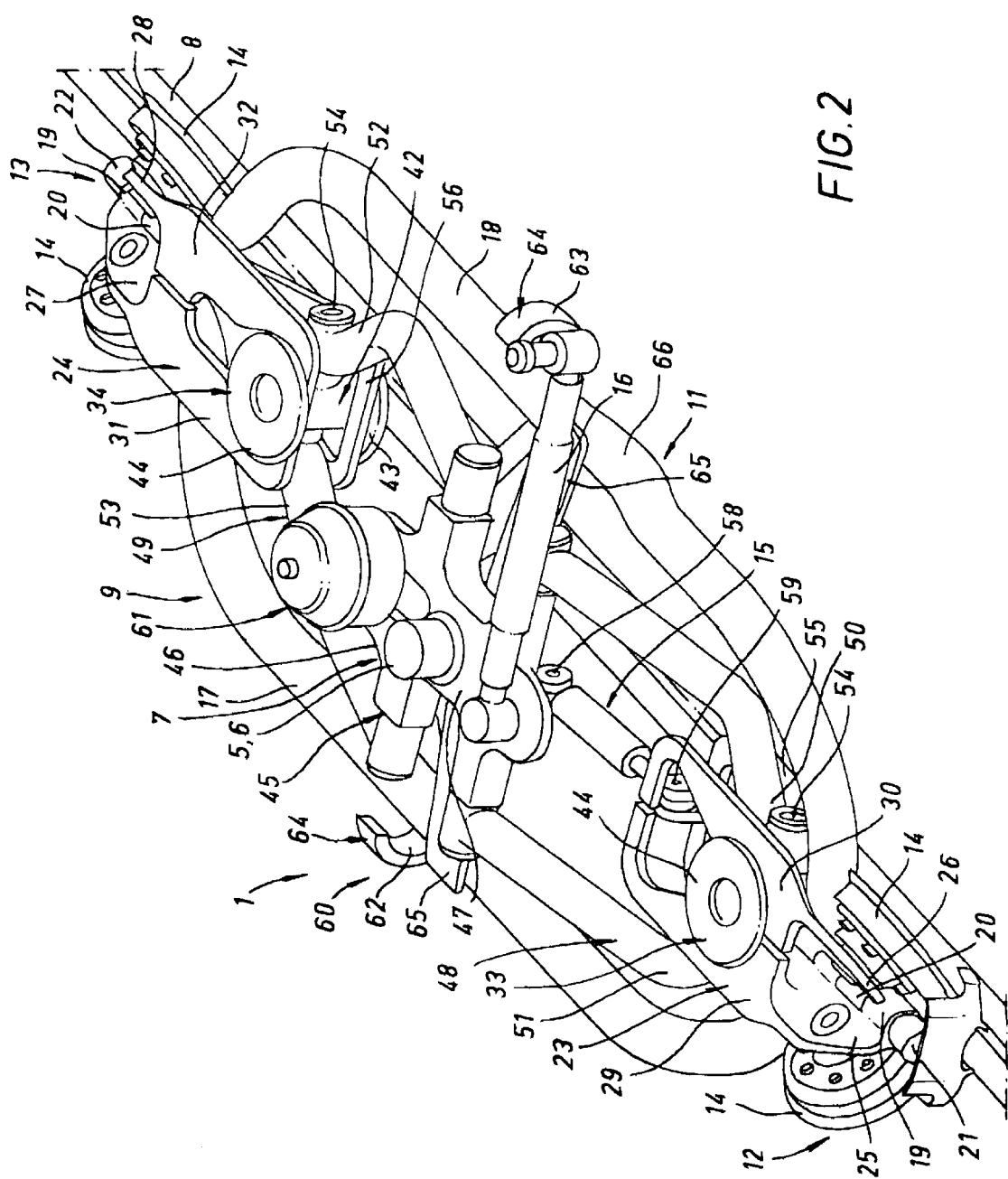

Bidirectional guide assembly 1 according to the invention is joined to a vehicle axle 2 having wheels 3 and 4 by means of an articulation 5 shown schematically by central connecting block 6 between vehicle axle 2 and a central axle block 7. This articulation, which may be a ball-socket articulation, only transmits directional movement if the vehicle axle is a directional axle.

This bidirectional assembly is designed to guide vehicle axle 2 or to activate the directional wheels and guide them along guide rail 8 while providing the vehicle axle with lateral clearance, known as lateral offset, whatever the direction of movement.

In terms of function, this assembly can be divided into two essential sub-assemblies, a guiding sub-assembly 9 and a guided sub-assembly 10. The first sub-assembly 9 is longitudinally displaceable in relation to axle 2.

A dual interface connection connects each extremity of the chassis-frame 11 to guided sub-assembly 10 so that they are longitudinally displaceable in relation to the vehicle.

Guiding sub-assembly 9 is composed of a chassis-frame 11 which is self-supporting when positioned for movement along guide rail 8 and supported by vehicle axle 2 when in the raised position, that is, when configured to be guided manually by the driver of the vehicle.

Chassis-frame 11 comprises at each extremity a front pair 12 and a rear pair 13 of guide wheels such as wheels 14 angled in a downward-pointing V engaged on guide rail 8, supporting the chassis-frame and moving it along said guide rail.

The dual interface connects each extremity of chassis-frame 11 to each extremity of guided assembly 10 by means of a composite articulation with a movable portion allowing each one, by means of longitudinally displacing the chassis-frame 11 relative to the vehicle and relative to the vehicle axle 2, to alternate between the pivoting-axle state, or the angular transverse clearance state for automatic guidance, passing through the non-functioning state to the automatic guided state corresponding to the central position.

As indicated, guiding sub-assembly 9 is longitudinally and translationally displaceable in relation to axle 2 and essentially in the vehicle axle due to the action of inversion cylinder 15, alternating between one extreme position of longitudinal operation relative to the rail and the opposite extreme position of longitudinal operation in the other direction. This reversal of end positions corresponds to the reversal in the vehicle's direction of operation in guided mode using directional rod 16.

The change takes place by passing into a neutral central position, in which chassis-frame 11 can be raised and in which the guide wheels are not engaged on guide rail 8. The bidirectional assembly becomes inactive and axle 2 is then guided manually by the driver across the direction of the vehicle activating the appropriate control connected to central axle block 7, or directly to axle 2 or to the directional wheels, in order to change direction.

Following these general considerations, the different parts and elements comprising the bidirectional assembly of the invention will be examined in detail.

The chassis-frame 11 is formed of two longitudinal halves or branches 17 and 18 pivotably attached at each extremity to a longitudinal axle parallel to the longitudinal axle of the vehicle.

It is possible, as in the variation shown in the drawings, to have two straight-bodied, tubular branches 17 and 18 with inwardly curved extremities connecting at the tips at hinges 19 and 20, which over lap to form a continuous cylindrical housing occupied by a portion of the end pivot axle 21, 22, constituting the pivot assembly that joins the hinges to each other. Because of the right-left symmetry, end pivot axles 21 and 22 are aligned.

The upper portions of hinged elements 19 and 20 on pivoting branches 17 and 18 of frame 11 are each followed by support plates 23 and 24, which are complex in form and fulfill several functions.

Said support plates 23 and 24 have a lower vertical portion which serves as an individual guide wheel support 25, 26, and 27, 28 with a guide wheel such as wheel 14 attached to each one by means of a moving connection providing the necessary operational play.

The two opposing guide wheel supports are inclined at the same angle as the wheels and are attached precisely with some degree of elastic deformation.

Guide wheel supports 25 through 28 extend upward and curve inward horizontally, giving rise to half-plates 29 through 32 with hooked ends designed to move together laterally to form a plate support 23 or 24 for guiding and supporting movable separating elements 33 and 34 when the frame is raised, as well as to allow lateral clearance for these elements. Each movable spacing element 33 and 34 serves as a spacer and also assumes other functions such as that of a pivot axle between chassis-frame 11 and guided sub-assembly 10 for the movable spacing element located at the front, that of clearance block for the movable separation piece located at the rear, or that of a pivot block for branches 17 and 18 of frame 11.

Each of the interface connections is an articulation incorporating an end piece 33 or 34 of guided sub-assembly 9 and a support longitudinally movable relative to the vehicle which constitutes the upper portion of each extremity of guiding sub-assembly 9.

Support plates 23 and 24 define a support with dual levels which can be inclined when the branches of chassis-frame 11 pivot. They each consist of the side-by-side arrangement of two half-plates 29,30 and 31, 32 with hooked ends moving next to each other and tilting together or apart from each other as the branches of the chassis-frame (11) pivot up or down to allow displacement of the guide wheels in relation to one another.

The two half-plates 29, 30 and 31, 32 define a central opening 35 which is pear-shaped with a narrow median portion 36 separating a large clearance opening 37 directed toward the central portion of chassis-frame 11 and a small guide opening 38 each directed toward one extremity of chassis-frame 11. Support plates 23 or 24 are each traversed by one of the movable separating elements 33 or 34 as they are displaced in the longitudinal axle of the directional assembly along central opening 35 to narrowed portion 36.

Figure 6:
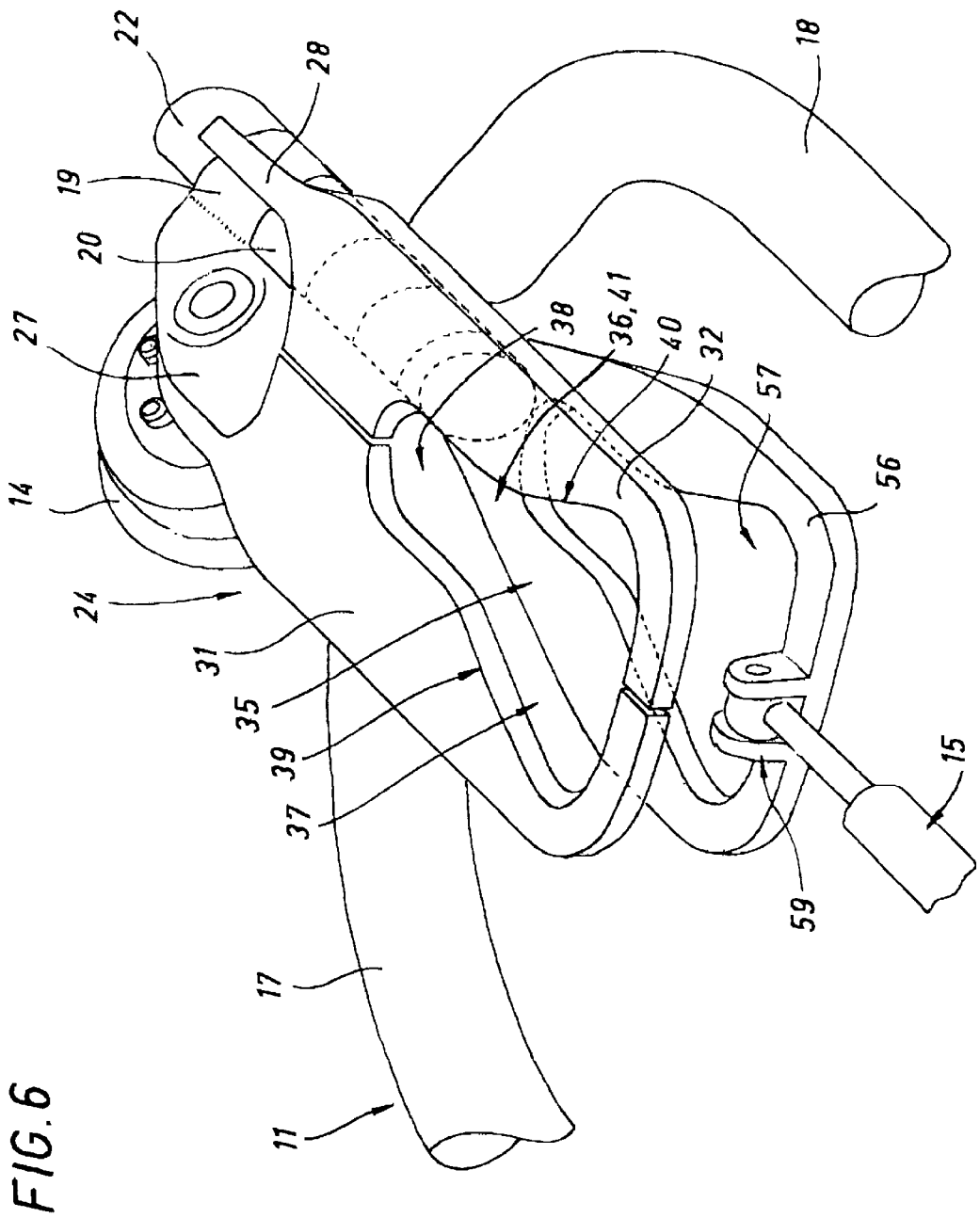
FIG. 6 is a detailed perspective view from the rear showing the extremity actuated by the reverse cylinder.

Large opening 37 has converging edges 39 and 40. These edges converge toward a narrowed median zone 41 corresponding to narrowed portion 36 near the entry of small opening 38 (FIG. 6).

Each central opening 35 is displaced while guided by a movable separating piece; its edges support corresponding movable separating piece 33 or 34 at the level of its upper portion.

Each extremity of branches 17 and 18 of chassis-frame 11 forms a single mono-block element incorporating three functions: guide wheel support, pivoting articulation between branches 17 and 18, and movable sliding/guiding support for each end piece of guided sub-assembly 10.

Preferably, separating elements 33 or 34 are shaped like coil-axles with the cylindrical central portion 42 forming the axle and with two end flanges 43 and 44.

Support plates 23 and 24 along with their related functional elements are located inside chassis-frame 11.

The invention also concerns an embodiment in which the functional groups of support plates 23 and 24 and the associated guide wheels 14 are arranged in the reverse configuration, that is, with support plates 23, 24 outside chassis-frame 11 and guide wheels 14 inside chassis-frame 11.

Each separating element 33 and 34 can assume three characteristic positions: an automatically guided directional position within small opening 38, a limited lateral clearance position within large opening 37, and a neutral intermediate position at the entry to narrowed portion 36, the latter being the configuration in which the frame is raised, that is, in the inoperative state when it is in the intermediate position between the two openings in narrowed portion 36.

The width of small opening 38 when connecting the supporting half-plates must be smaller than the diameter of cylindrical axle 42 of separating elements 33 or 34 in order to lightly push wheels 14 together after clearing narrow portion 36, that is, to impose a force impelling them toward each other when they are engaged on guide rail 8.

Guided sub-assembly or central mechanism 10 is composed of a cross axle 45 pivotally connected to the vehicle axle 2 by central connecting block 6. In manual mode, when chassis frame 11 is in the non-functioning, raised position, cross axle 45 may remain immobile and in turn, the directional wheels are steered by another control which takes over; optionally, rod 16 is no longer subjected to the pivoting movement of the automatic bidirectional assembly.

Cross axle 45 has a double cross shape with two transverse structures 46 and 47, each having a pivoting arm 48 and 49 attached to it.

The unit formed by the two connecting pivoting arms 48 and 49 constitutes the articulated connection between guided sub-assembly 10 and displaceable guiding sub-assembly 9.

Pivoting connecting arms 48 and 49 each consist of two branches 50, 51 and 52, 53 with angled ends, joined at the angled extremities located above cross-axle 45 by a transverse pivot axle 54 integral with the bodies of separation elements 33 or 34. The opposite extremities of the branches of pivoting arms 48 and 49 are pivotably attached to the extremities of transverse structures 46 and 47 forming central cross axle 45.

Separation elements 33 and 34 are formed by tubular axle 42 terminating in two end flanges 43 and 44 allowing them to rest on support plates 23 and 24. It is obvious that end flanges 43 and 44 must be larger in diameter than the large opening 37 in support plates 23, and 24.

Said support plates 23 and 24 are duplicated at the lower portion by sliding plates 55 and 56, which are flat and made as a single piece. Generally triangular in shape, each has a central opening 57 which is pear-shaped or similar to the opening in support plates 23 and 24. Said sliding plates 55 and 56 are inseparable and the top of each one extends into a solid or tubular axle element, each of which forms one of the end axles 21 and 22.

The support plates and the sliding plates are guided in displacement along separation elements 33 and 34 when chassis-frame 11 moves translationally.

The motion originates from the action of dual reverse cylinder 15 articulated between the subsurface of one longitudinal extremity of cross axle 45, for example, the axle that receives directional rod 16 by means of pivoting articulation 58, and one of the sliding plates 55 or 56 by means of pivot axle 59 attached between two elements.

The bidirectional assembly according to the invention is completed by a lifting mechanism 60, which may consist, for example, of a pneumatic or hydraulic drive means 61 with an articulated rod which pivots two lifting arms 62 and 63 with hooked ends 64 and raises or lowers them. Lifting arms 62 and 63 are pivotably articulated to cross axle 45 on central axle block 7. Their hooked ends 64 contact the branches 17 and 18 of chassis-frame 11, causing them to pivot upward slightly during the first lifting phase as far as the block that abuts the halves of upper support pieces 23 and 24, thus disengaging guide wheels 14 and finally raising the unit and releasing guide wheels 14 from guide rail 8, as described in detail below.

The end hooks 64 of lifting mechanism 60 do not engage the branches of chassis frame 11. They merely constitute a second lateral block which provides additional security by limiting lateral offset in axle 2 if traction is lost.

The bidirectional assembly also comprises a flexible transverse plate 65, preferably spring-loaded, applying permanent flexible pressure and pressing down upon the guide wheels on the guide rail, and also a supplemental flexible force pushing guide wheels 14 together so they will grip rail 8, thereby providing the security of elastic recall by pivoting downward.

In branch 18, either near direction control rod 16 or formed within this branch, there is a downward deformation 66 forming a recess designed to eliminate any harmful interference between chassis frame 11 and the direction control rod.

Figure 12:
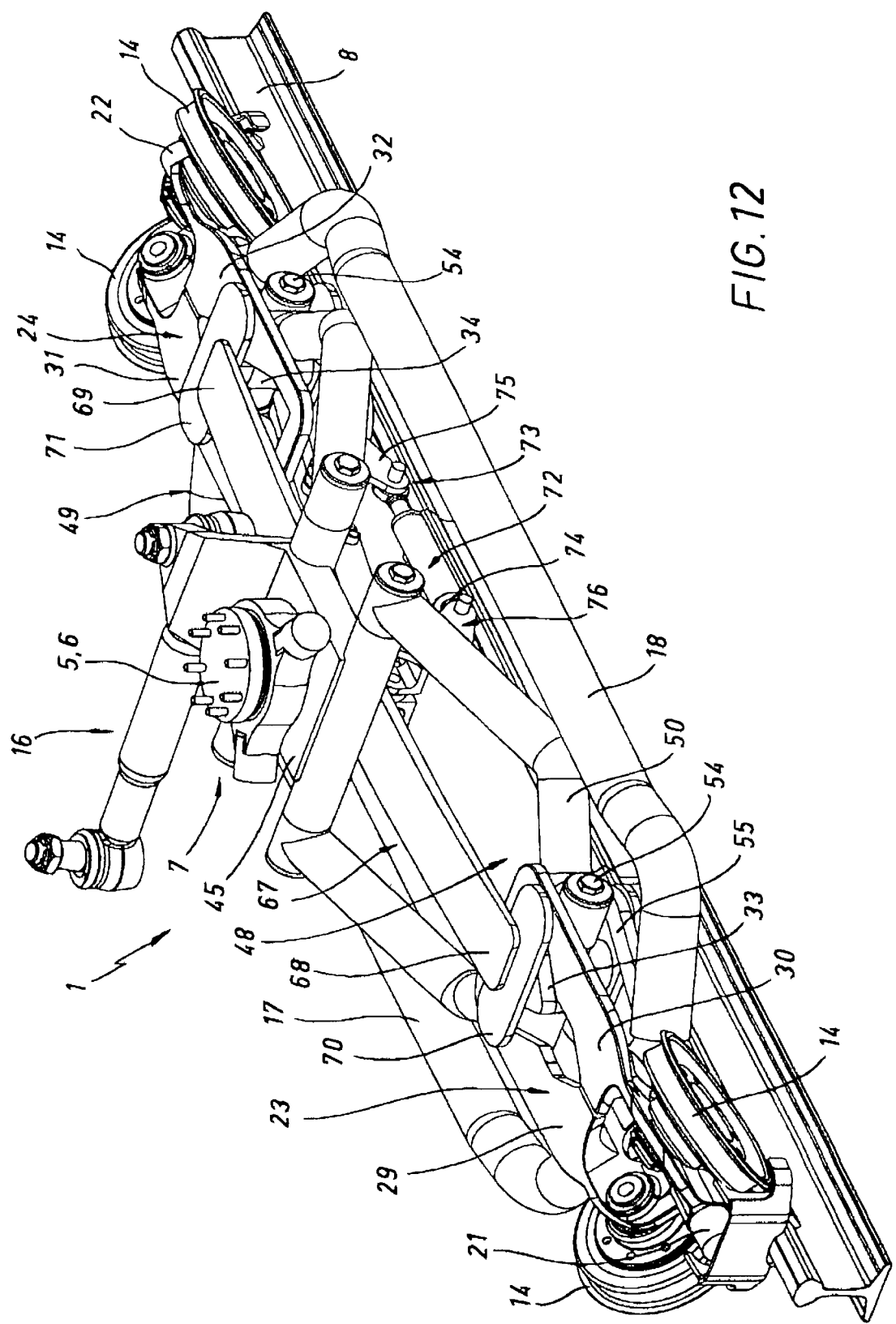
FIG. 12 is a perspective view of the assembly showing a variation with a longitudinal contact plate.

FIG. 12 shows a variation of the lifting assembly in which the guide wheels are not released from the guide rail. The constant downward preconstraint takes the form of permanent localized contact on the upper portion of each separating element 33 or 34. This flexible preconstraint consists of flexible pressure which, in the embodiment shown, arises from the extremities of a fixed longitudinal spring-loaded plate 67. Each extremity 68 or 69 of the plate contacts upper flange 70 or 71, respectively, of each separation element 33 or 34. The upper plane formed by the two half plates 29, 30 and 31, 32 located side by side slides below these flanges when chassis frame 11 is longitudinally displaced at the moment the reverse cylinder reverses the direction of movement.

This variation is also distinguished by a different lifting mechanism. Referring to FIG. 12, note that the lifting mechanism uses the pivoting connecting arms 48 and 49 on guided sub-assembly 10. The drive means is a separating cylinder 72 attached parallel to guide rail 8 between two branches similar to the two pivoting connecting arms. Separating cylinder 72 comprises a shaft 73 and a body 74. The free end of shaft 73 is articulated to a housing 75 and body 74 to another housing 76 integral with the adjacent branch of pivoting arms 49 and 48, respectively. The cylinder may have two shafts. In this case, the second shaft is attached to the corresponding housing.

During the lifting operation, this cylinder works by separating the two pivoting connecting branches which, when pushed, are forced into an upward pivoting motion and are lifted when they encounter the flexible downward push of longitudinal contact plate 67. Because of the constant flexible contact on half-plates 29 through 32 arranged side by side exerted by the ends of longitudinal plate 67 through flanges 70 and 71, the lifting motion does not necessarily cause the guide wheels to have previously separated, even if not locked together.

The invention also relates to a simplified variation (not shown) in which the chassis frame 11 is no longer formed of two pivoting branches 17 and 18, but is formed of a rigid frame or perimeter.

As before, in this variation the guide wheels are vertically pressed against the guide rail by some type of flexible downward pressure originating from one or more sources to improve wheel guidance. It is obvious that in this embodiment, it is not possible to disengage the wheels during the lifting operation. Therefore, the wheels must be removed from the rail at the end of the guided zone.

Three modes of operation are distinguished:
  manual mode in which frame 11 is raised;
  operation in automatic guided mode in one direction with limited lateral movement;
  operation in automatic guided mode in the other direction with limited lateral movement.

The transition from one automatic guided mode to the other occurs due to the action of reverse cylinder 15 when the vehicle is stopped.

In automatic guided mode, the front separation element, for example element 33, is located inside small opening 38 in the support plate, for example support plate 23 located near the front, while rear separation element 34 occupies a central position in the large opening 37 of rear support plate 24 in order to allow a certain amount of angular lateral clearance for axle 2.

Figure 7:
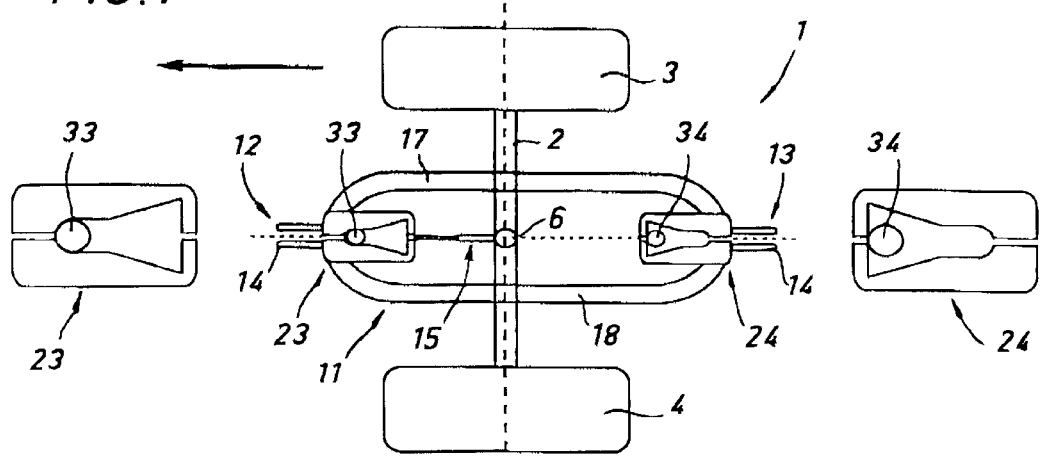
FIGS. 7 through 9 are schematic view of the guide assembly seen from above showing the positions of the separating elements in the three basic configurations without lateral movement, i.e., displacement in a first direction, raised position, and displacement in a second direction.
Figure 9:
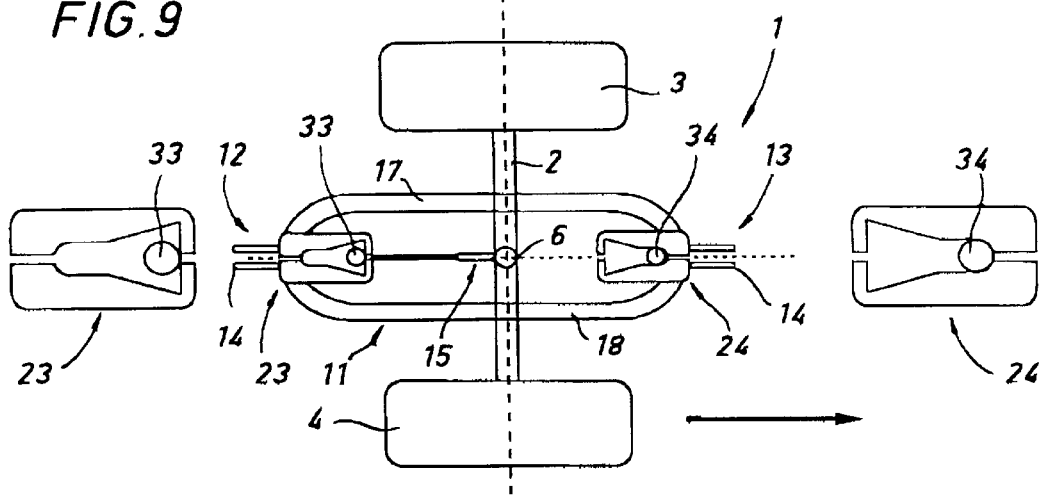

The passage from one guided mode, subjected to the rail in one direction (FIG. 7) to the other guided mode in the other direction (FIG. 9) occurs by virtue of action on cylinder 15. The cylinder acts on the opposing side plate 55 and either pushes or pulls frame 11 with its support plates 23 and 24 relative to axle 2 to reverse the positions of separating element 33 and 34 relative to the corresponding lights.

Separating element 33 or 34 occupying small opening 38 in support plate 23 or 24 is always the forward separating element in the direction of operation. It serves as the pivot center for automatic guiding. In this position, the presence of the front separating element prevents guide wheels 14 from leaving rail 8, maintaining them close together by separating the adjacent half-plates.

Figure 10:
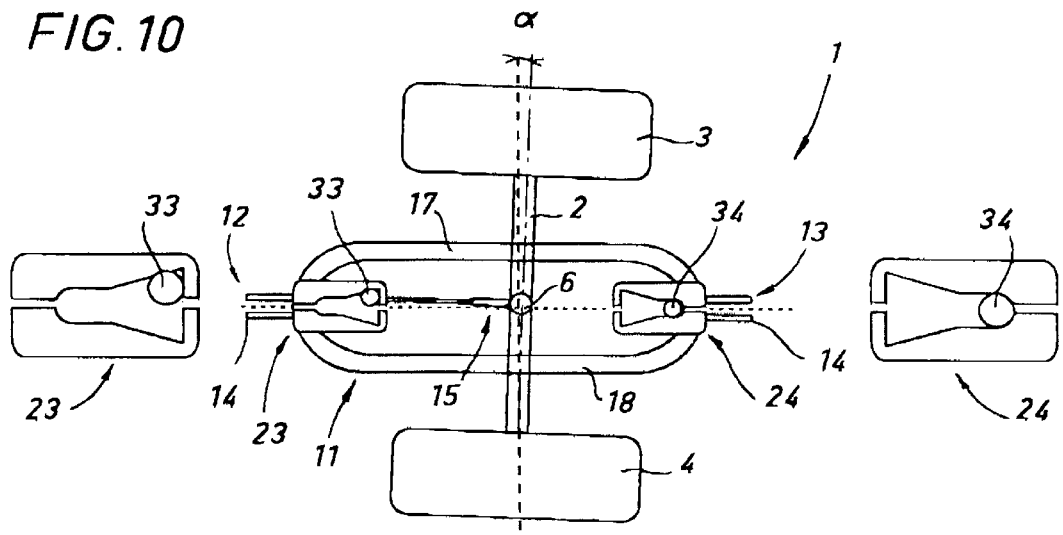
FIGS. 10 and 11 are schematic views showing two positions of lateral movement in opposite directions.
Figure 11:
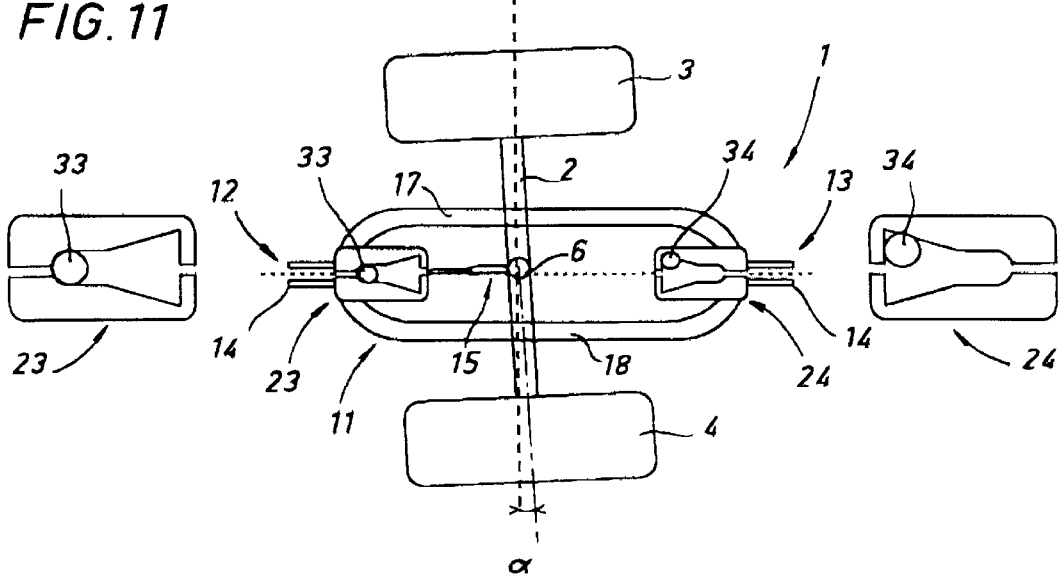

FIGS. 10 and 11 show the lateral clearance of axle 2 allowing an angular deviation "a" relative to the direction transverse to the vehicle.

Figure 8:
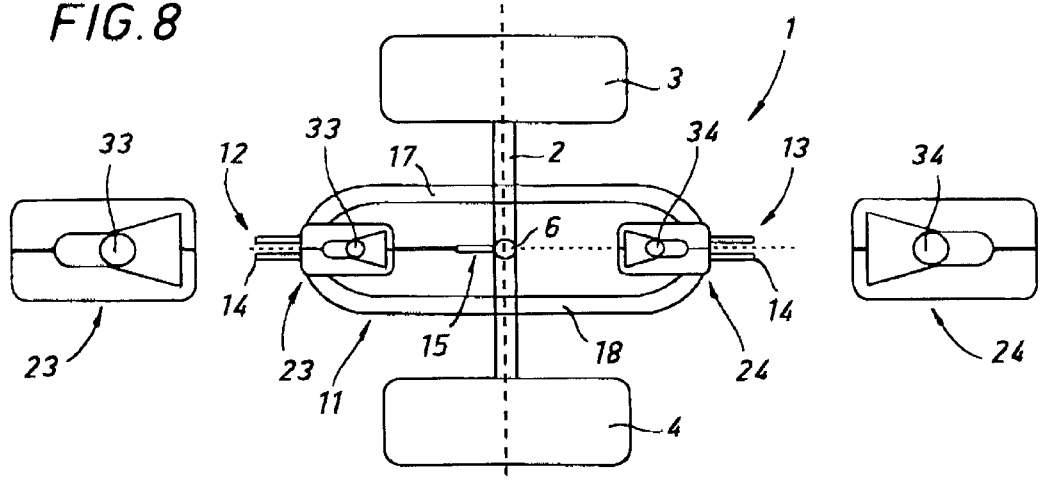

The transition to the manually guided mode (FIG. 8) occurs when reverse cylinder 15 places frame 11 in a median position, which corresponds to the two tubular portions 42 having exited the narrowed portion 41 of central opening 35. The wheels are thus freed from pivoting in relation to each other.

Figure 4:
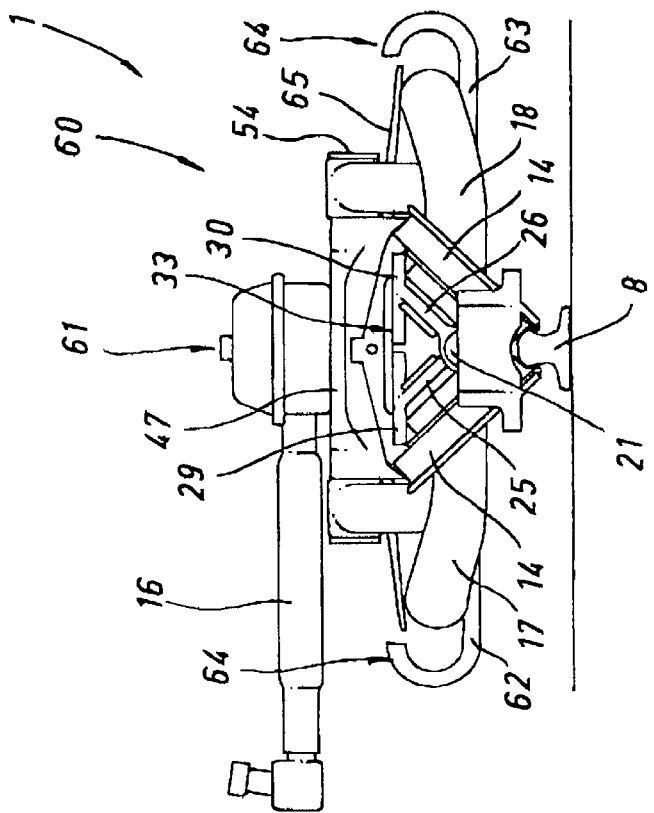
FIGS. 3 and 4 are front views showing the bidirectional assembly according to the invention first in raised position and then in lowered position, engaging the rail.
Figure 3:
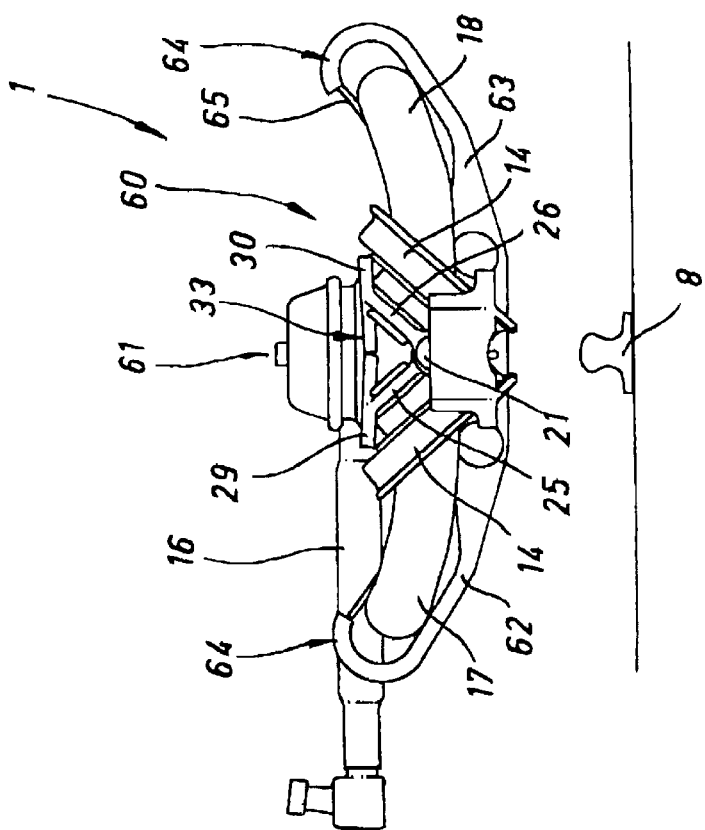
Figure 5:
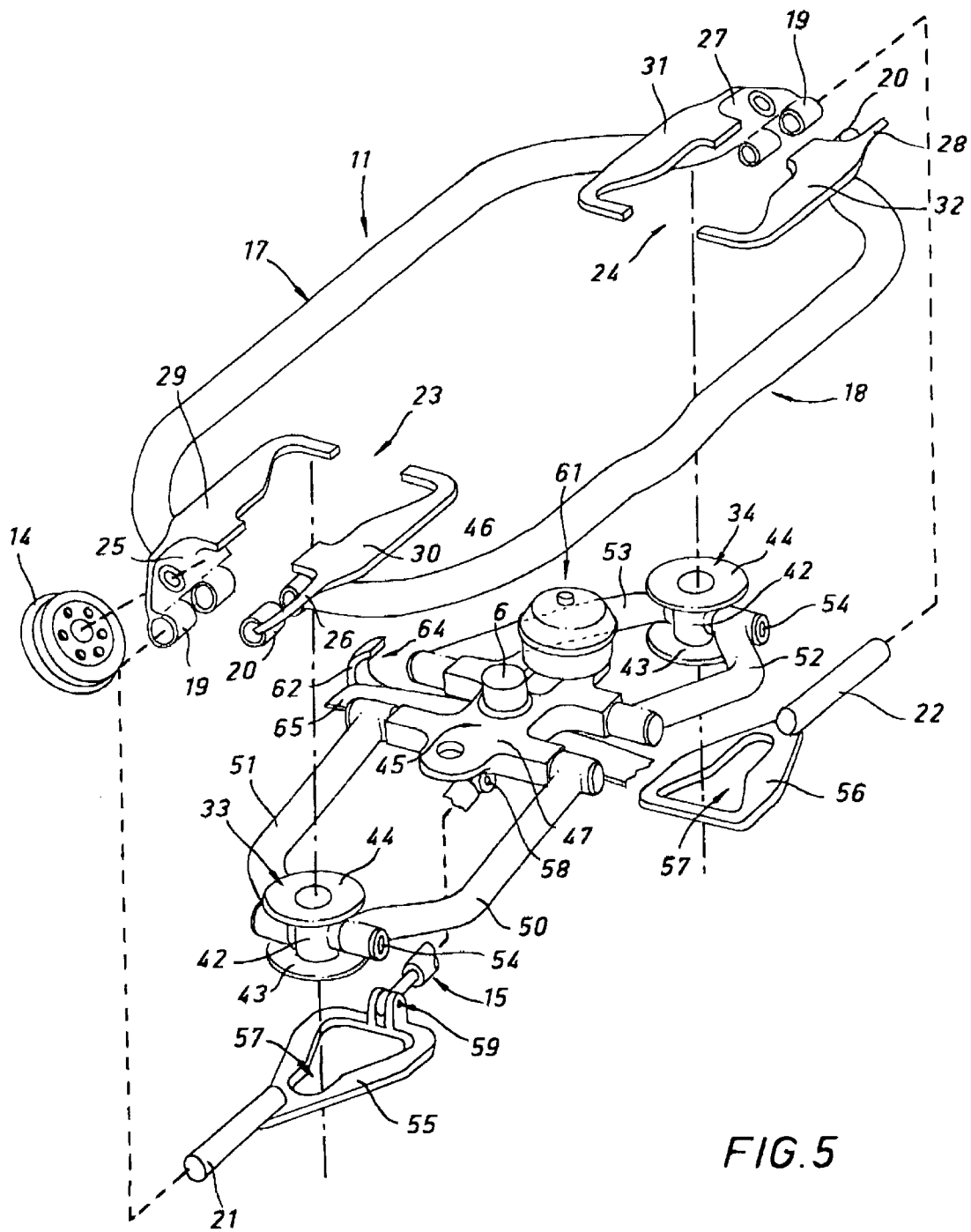
FIG. 5 is a perspective with the elements separated to show the various component parts of the guide assembly according to the invention.

Next is the lifting operation. As with the variation shown in the first drawings, the lifting operation takes place when a drive means 61 acts on the rod of lifting mechanism 60. The pull on the extremities of lifting arms 62 and 63 makes them pivot upward and thus raises branches 17 and 18 of chassis frame 11 up to the level of the connection between the two half plates of each support plate 23 or 24 (FIGS. 3 and 4).

The chassis frame 11 raises up and guide wheels 14 lift and are freed from rail 8 at the same time as the pivots and the mechanically associated elements such as pivoting connection arms 48 and 49, assuming an upper position in which the extremities of lifting arms 62 and 63 force branches 17 and 18 of frame 11 against flexible transverse plate 65. The latter element provokes a flexible downward push, thus producing a locking and immobilizing effect against the hooked extremities of lifting arms 62 and 63.

During this movement, pivoting connection arms 48 and 49 of guided sub-assembly 10 pivot upward, since the first extremities of the arms are driven into an ascending motion by separation elements 33 and 34, which are themselves raised by chassis frame 11.

In the variation in FIG. 12, lifting occurs through the use of a horizontal separation cylinder 72. On command, this cylinder causes the pivoting connection arms of the guided sub-assembly pivots to separate and pivot, thus freeing the guide wheels from the guide rail.

To return to the automatically guide mode, the reverse operations are performed.

The guide wheels are repositioned in locked configuration on the rail, having either been previously separated or not, depending upon the embodiment.

However, in the simplified variation with the rigid chassis frame, which is not shown, it is necessary to engage the guide wheels by passage through a guide entry zone.

What is claimed is:

1. A bidirectional assembly for guiding a vehicle along a guide rail (8) and limiting lateral deviation of a guided vehicle axle (2), the bidirectional assembly comprising two pairs of guide wheels (14), each pair of guide wheels (14) being arranged in a V-shaped configurations, located on opposite sides of the axle (2) and being engageable with the guide rail (8), wherein the bidirectional assembly further comprises of the following functional module:
   a guided sub-assembly (10) composed of a central axle block (7) which is attached to the axle (2) for steering the axle (2) or directional wheels (3, 4) and automatically guiding the guide wheels (14) along the guide rail (8), and a rear portion of the guided sub-assembly (10) being capable shifting transverse about a pivot location formed adjacent a leading pair of the guide wheels (14);
   a guiding sub-assembly (9) composed of a chassis-frame structure (11) which comprises two opposed extremities extending on opposite sides of the axle (2), each of the two opposed extremities supports one of the two pairs of guide wheels (14) for engaging with the guide rail (8), and the sub-assembly (9) is longitudinally displaceable, relative to the guided assembly (10), between first and second end positions located on opposed sides of the axle (2);
   a dual interface connection joining each of the two opposed extremities of the chassis-frame structure (11) to the guided sub-assembly (10) in such a way that the two opposed extremities are articulatable and longitudinally displaceable relative to the axle (2); and
   displacement of the guiding sub-assembly (9) into the first end position allows an autoguided mode with lateral clearance for the axle (2) in a first travel direction of the vehicle and displacement of the guiding sub-assembly (9) into the second end position allows an autoguided mode with lateral clearance for the axle (2) in a second travel direction of the vehicle, and the guiding sub-assembly (9) has a central displacement position located between the first end position and the second end position.

2. The bidirectional guide assembly according to claim 1, wherein the central displacement position, through which the guiding sub-assembly (9) passes during displacement from the first end position to the second end position and vice versa, is a neutral position which allows lowering of the bidirectional assembly and engagement of the guide wheels (14) with the guide rail (8) and also allows raising of the bidirectional assembly and disengagement of the guide wheels (14) from the guide rail (8) to allow guiding of the axle (2) or the directional wheels (3, 4) in a manual operating mode.

3. The bidirectional guide assembly according to claim 1, wherein the chassis-frame (11) is formed of two branches (17 and 18) pivotally articulated to one another at the two opposed extremities thereof and the two branches (17 and 18) pivot together about a longitudinal pivot axle which extends parallel to a longitudinal axis of the bidirectional guide assembly.

4. The bidirectional guide assembly according to claim 1, wherein the dual interface connection joins the two opposed extremities of the chassis-frame (11) to the extremities of the guided assembly (10) by a composite articulation with a movable portion allowing each one of the dual interface connections, as a result of longitudinally displacing the chassis-frame (11) relative to the axle (2), to be in one of a pivot-axle state, a transverse lateral clearance state and an inoperative state corresponding to the central displacement position.

5. The bidirectional guide assembly according to claim 4, wherein connecting elements, which joins the central axle block (7) of the guided assembly (10) to the two opposed extremities of the chassis-frame (11), are pivoting arms (48 and 49) with a first end of each of the pivoting arms (48 and 49) pivotably articulated to transverse structures of the central axle block (7) and with second opposed ends of the pivoting arms (48 and 49) connected to a transverse axle of a movable separating element of the guided assembly (10).

6. The bidirectional guide assembly according to claim 4, wherein each of the dual interface connections is an articulation incorporating a movable separating element (33 or 34) on the guided sub-assembly (9) and a support that is longitudinally movable relative to the axle (2) and which constitutes an upper portion of each extremity of guiding sub-assembly (9).

7. The bidirectional guide assembly according to claim 6, wherein the chassis-frame (11) is formed of two branches (17 and 18) pivotally articulated to one another at the two opposed extremities thereof, each extremity of the two branches (17 and 18) of the chassis-frame (11) forms a single, monoblock element which:

supports the guide wheels (14);

allows simultaneous pivoting articulation of the two branches (17 and 18); and forms a movable sliding and guiding support for each movable separating element of the guided sub-assembly (10).

8. The bidirectional guide assembly according to claim 3, wherein the opposed extremities of each of the two branches (17 and 18) of the chassis-frame (11) are formed as hinge structures (19 and 20), and the hinge structures are aligned with one another to form a housing for accommodating the longitudinal pivot axle which allows pivoting motion of the two branches (17 and 18) with respect to one another.

9. The bidirectional guide assembly according to claim 8, wherein each extremity of the two branches (17 and 18), adjacent the hinge structures (19 or 20) form a guide wheel support, and the guide wheel supports of the two branches (17 and 18) are arranged in pairs adjacent one another at the extremities of the two branches (17 and 18) to form the V-shaped configuration of the guide wheels (14).

10. The bidirectional guide assembly according to claim 9, wherein upper portions of the extremities of each of the two branches (17 and 18) are half-plates (29 through 32) with hooked ends, and the hooked ends of the half-plates (29 through 32) move closer to one another into a side-by-side arrangement during downward pivoting motion of the two branches (17 and 18) of the chassis-frame (11) and moved farther apart from one another during upward pivoting motion of the two branches (17 and 18) of the chassis-frame (11) to allow displacement of the guide wheels (14) relative to one another.

11. The bidirectional guide assembly according to claim 10, wherein the half-plates with hooked ends combine with one another, upon laterally moving closer to one another into a side-by-side arrangement following completion of the downward pivoting motion of the two branches (17 and 18), to form support plates (23 or 24) for longitudinal movably supporting the extremities of the guided sub-assembly (10).

12. The bidirectional guide assembly according to claim 11, wherein the supports plates (23 and 24), formed by the half-plates with hooked ends combining with one another upon laterally moving closer to one another into the side by side arrangement, form a movable support with a pear-shaped central opening (35) formed by a joining a large opening with a small opening, and the large and small openings are separated from one another by a narrowing median zone.

13. The bidirectional guide assembly according to claim 12, wherein each movable separating element (33 or 34) of the guided sub-assembly (10) is formed of a cylindrical central portion (42) located between two end flanges (43 and 44) and each of the movable separating element (33 or 34) allows separation of the two half-plates (29 through 32) as well as acting as the pivot location for the autoguided mode when the half-plates are located in the small opening, and the movable separating element (33 or 34) allows lateral clearance when the movable separation element (33 or 34) is located in the large opening, and an exterior diameter of the cylindrical central portion (42) is larger than a width of the small opening.

14. The bidirectional guide assembly according to claim 1, the central axle block (7) has a double cross (45) shape with two transverse structures separated from one another by a central block (6), and the central axle block (7) provides an interface with the axle (2) and an autoguide directional rod (16) and the central block (6) also allows movement of the bidirectional guide assembly relative to the vehicle.

15. The bidirectional guide assembly according to claim 1, wherein a mechanism allows raising and lowering of the guide sub-assembly (9).

16. The bidirectional guide assembly according to claim 15, wherein a lifting mechanism, integral with the central axle block (7), allows raising and lowering of the guide sub-assembly (9), and the lifting mechanism comprises an assembly with two pivoting lifting arms activated by a central drive connected with the central axle block (7).

17. The bidirectional guide assembly according to claim 1, wherein an elastic force exerts a permanent force on the guide sub-assembly (9) biasing the two pairs of guide wheels (14) toward engagement with the guide rail (8).

18. The bidirectional guide assembly according to claim 17, wherein the chassis-frame (11) is formed of two branches (17 and 18) pivotably articulated to one another at the two opposed extremities thereof, and the elastic force is exerted by a flexible transverse plate (65) with opposed extremities thereof contacting the two branches (17 and 18) of the chassis-frame (11).

19. The bidirectional guide assembly according to claim 17, wherein the elastic force is exerted by a flexible longitudinal plate (67) which has extremities (68 and 69) thereof which contact upper flanges of movable separation elements (33 and 34).

20. The bidirectional guide assembly according to claim 1, wherein the chassis-frame (11) is a rigid frame with two fixed branches (17 and 18).

* * * * *